Jan. 12, 1932.  G. E. ROWE  1,840,532
MANUFACTURE OF BLOWN GLASSWARE
Filed Jan. 4, 1929   2 Sheets-Sheet 2
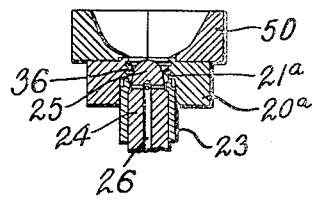
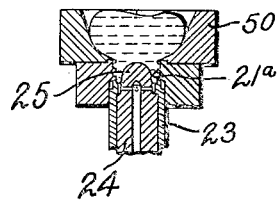
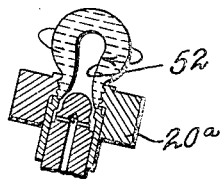
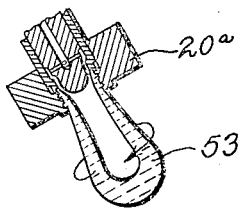
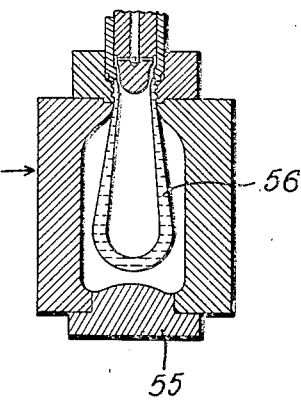
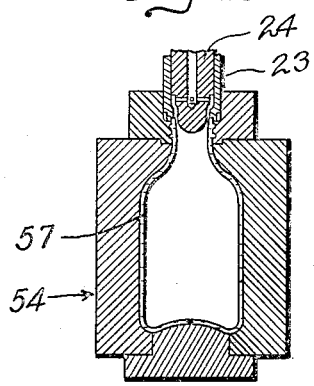
Inventor
George E. Rowe
by Robson D Brown
Attorney
Witness:
Jas. G. White Jan. 12, 1932.　　　　G. E. ROWE　　　　1,840,532
MANUFACTURE OF BLOWN GLASSWARE
Filed Jan. 4, 1929　　2 Sheets-Sheet 1
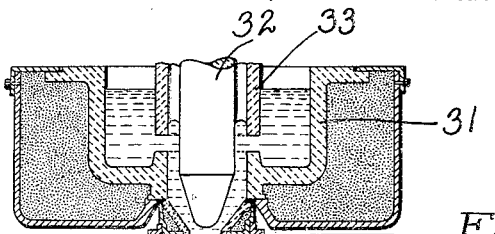
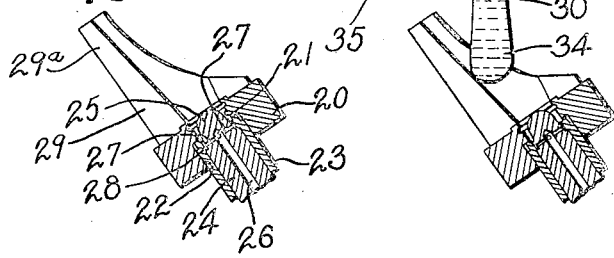
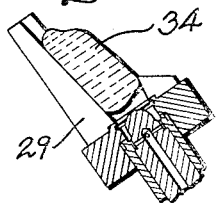
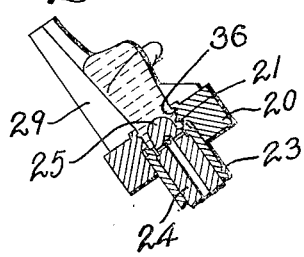
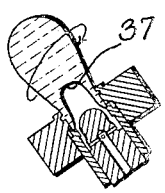
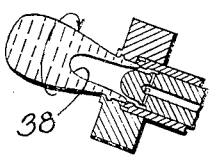
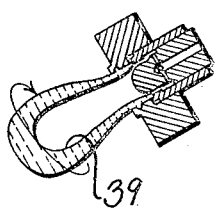
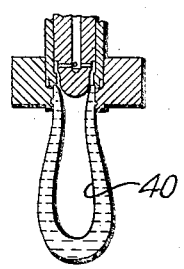
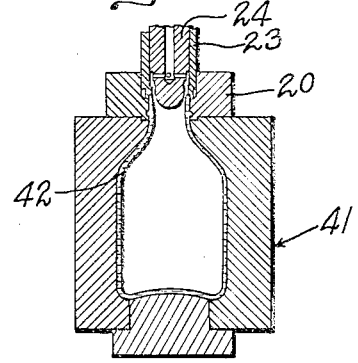
Witness:
Jas. G. White
Inventor
George E. Rowe
by Robson D Brown
Attorney Patented Jan. 12, 1932

1,840,532

UNITED STATES PATENT OFFICE

GEORGE E. ROWE, OF WEST HARTFORD, CONNECTICUT, ASSIGNOR TO HARTFORD-EMPIRE COMPANY, OF HARTFORD, CONNECTICUT, A CORPORATION OF DELAWARE

MANUFACTURE OF BLOWN GLASSWARE

Application filed January 4, 1929. Serial No. 330,226.

My invention relates generally to the manufacture of blown glassware by machinery as distinguished from "hand blowing".

An object of the invention is to improve the manufacture of blown glassware so as to obtain a more uniform distribution of glass in the walls of the finished article than has been possible with the use of automatic machinery prior to the present invention, and to prevent excessive thickness of any portion of such walls, whereby an economy in the cost of an article produced is effected without impairment or lessening of the quality or effective strength of such article.

A further object of the invention is to practically prevent unequal chilling of different portions of the glass which will form the walls of a finished article of blown glassware thus tending to prevent variations in the thickness of the "skin" of such glass and aiding in obtaining the aforesaid uniform and controlled distribution of glass in the walls of the finished article.

A further object of the invention is to provide for a minimum thickness of skin formation on the glass for the body of an article that is being formed while at the same time providing the desired control of the shape of such glass, thereby permitting the use of relatively low fluid pressure for the blowing of the glass to form the article.

A still further object of the invention is to simplify the manufacture of blown glassware by eliminating certain of the intermediate method steps and certain transfer devices and other instrumentalities commonly employed in the manufacture of blown glassware prior to the present invention, thus tending to increase the production of glassware for any given period of time.

Other objects and advantages of the invention will be apparent from the following description, when it is considered in conjunction with the accompanying drawings.

As is well known, articles of hollow glassware, such as bottles, jars, and the like are commonly made by placing a mold charge in a parison mold, pressing or blowing or pressing and blowing the mold charge in the parison mold to form a blank or parison, transferring the parison to a finishing mold, and expanding the parison by pressure fluid to fill the finishing mold. This ordinary method of producing blown hollow glassware usually requires mechanism for transferring the parison from the blank mold to the finishing mold, metallic parison molds as well as metallic finishing molds, and supporting, operating and timing mechanism for these various instrumentalities, whereby a forming machine for carrying out such ordinary and commonly used method must of necessity be relatively heavy and complex.

An article of hollow glassware produced by such commonly used method and by the use of mechanism such as above indicated usually has different portions of the walls thereof unequal in thickness and has excess glass at various places in its walls. Such excess glass serves no useful purpose but on the contrary adds to the cost of production of the article and tends to induce certain other disadvantages, such as variations in the shape, strength and capacity of individual articles. The relatively prolonged chilling of the glass, because of its contact with both a metallic parison mold and a metallic finishing mold, the variations in the chilling of such glass because of the different temperature environment to which it is subjected while it is in the parison mold, is being transferred from the parison mold to the finishing mold, and is in the finish mold, respectively, and the different pressure conditions to which the glass is subjected in the parison and finishing mold, probably all contribute to the production of the features of disadvantage above pointed out as being inherent in or ordinarily attendant on the manufacture of blown glassware by the commonly used method referred to.

The present invention aims to obviate such features of disadvantage and in accomplishing this purpose, the use of a parison mold and the step of forming a parison or blank in a parison mold may be dispensed with, thus permitting considerable simplification of the structural elements which will be required to carry out the invention and also eliminating some of the factors which tend to cause unequal chilling of and unequal and relatively thick skin formation on glass of different portions of the walls of the article being formed and in a measure, unequal distribution of glass in different portions of the walls of such article.

It has been proposed prior to the present invention to manufacture blown glassware without the use of a parison mold and without forming a blank in a parison mold, as disclosed by Patents, Nos. 1,592,299 and 1,673,747, granted July 13, 1926 and June 12, 1928, respectively, to George E. Howard, and by Patent No. 1,680,746, granted August 14, 1928, to Karl E. Peiler. However, the present invention comprises many novel features for improving known methods of manufacturing blown glassware, which are not disclosed in the aforesaid patents or included in any known process provided prior to my invention. Such novel features of the present invention will be hereinafter set out in detail.

The present invention may dispense with the use of a parison mold and provide for the delivery of a mold charge of molten glass to a neck mold. The neck mold will be disposed in an inverted position with its axis vertical, or in an inverted position with its axis inclined from the vertical. The mold charge may be severed from its source of supply before it contacts with the neck mold and may be guided to position to rest against the upper end of the inverted neck mold by a suitable annular guide.

Part of the glass charge will be chilled only by exposure to the atmosphere. Such exposure will tend to produce a relatively thin skin on the glass. It is important that the portion of the charge that is in contact with the guide should not be chilled in such manner or to such extent as to cause any sharp difference in the thickness of the skin formations on the portions of the glass charge which respectively are exposed only to the atmosphere and are in contact with the guide as any abrupt or clearly defined change in thickness in the skin formation on the charge is likely to cause an objectionable change in the thickness of the walls of the finally blown article of glassware. The invention therefore contemplates such control of the temperature and condition of the portion of the charge that contacts with the guide as may be necessary to prevent any abrupt change of thickness of the skin formation at the line of juncture of the guide-contacting portion of the glass charge with the portion of the charge that will be chilled only by exposure to the atmosphere. In obtaining such control, the guide may be made of brush graphite as being a material which will have a relatively slight chilling effect on the glass and to which the glass will not stick when the guide is relatively hot. The guide may be insulated to reduce the radiation of heat from the glass or the guide may be made of any suitable material and provided with regulably controllable heating means for subjecting the glass to locally applied heat sufficient to prevent any objectionable thickness of skin formation on any part of the guide contacting glass of the charge.

As a variation, the lower end portion of the mold charge may contact with the guide or may be directed along the guide into contact with the upper end of the inverted vertically disposed or inclined neck mold before such mold charge is severed from its source of supply. In either event, the guide will tend to center the lower end of the mold charge in the upper portion of the cavity of the neck mold and temporarily will aid in giving a desirable form to the glass above the neck mold.

A combined neck forming and blowing device preferably is associated with the neck mold and includes a plunger, which projects upwardly into the cavity of the neck mold and has its upper end portion formed to cooperate with the cavity of the neck mold to form the neck finish or portion of a bottle or other article of hollow glassware that is to be produced.

Suction preferably is employed in the cavity of the neck mold to aid in drawing the glass into the space between the plunger and the wall of the neck mold cavity to form the neck finish of the article that is being made. When the neck finish has been formed the neck mold and the combined blowing and neck forming device are rotated as a unit about the axial line of the neck mold to aid in controlling the shape of the glass above the neck mold. This rotary or spinning motion of the glass may be commenced after the guide at the upper end of the inverted neck mold has been removed from the glass or while the glass above the neck mold remains in contact with and is partially supported by such guide. In the latter event, the neck mold probably will be inclined somewhat from the vertical during the rotary or spinning motion thereof and the guide will be suitably formed so that the spinning of the glass in contact with the inner wall of the guide will cause a marvering action on the glass, the guide of course being kept stationary while the neck mold is spinning or rotating about its axial line. The suction on the glass in the neck mold may be continued during this initial spinning or rotary motion of the neck mold to oppose any tendency of the glass of the neck finish to be pulled from its place in the neck mold.

During the continued spinning or rotary motion of the neck mold and the combined blowing and neck forming device, and after the guide has been removed from the glass above the inverted neck mold, the plunger of the combined blowing and neck forming device is displaced downwardly or retracted in the neck mold and pressure fluid is admitted through the blowing device into the preliminary neck cavity thus provided to blow the so called "bubble" in the glass. This blowing through the neck mold of the bare glass above the neck mold is attended by the continued spinning of the neck mold and the glass about the longitudinal axis of the neck mold and by the slow rotary movement of the neck mold, the combined blowing and neck forming device and the glass about a horizontal axis, to slowly revert the neck mold and the glass by a continuous motion or by two or more steps and to cooperate with the rotary or spinning movement of the glass about the axial line of the neck mold and the action of the pressure fluid within the glass to provide desirable control of the shape and preliminary thickness of the walls of the glass which will eventually form the body of the finished article of blown glassware. This blowing of the glass may be effected by a series of discontinuous puffs or by a continuous blowing action, the pressure of the fluid applied to the glass being regulable to aid in forming as desired the bare glass carried by the neck mold.

When the neck mold has been reverted and is in upright position with the glass depending therefrom and suspended by the neck portion of the article being formed, a finishing mold is closed about the partially blown pendant glass below the neck mold and such glass is expanded to fill the finishing mold and to form within the latter the body of the article that is to be produced. The expansion of the glass in the finishing mold may be effected by the application of pressure fluid supplied by the same blowing and neck forming device through which pressure fluid was applied to the bare glass. This obviously simplifies the operations and the number of structural parts that will be required to produce a finished article of blown glassware.

In the drawings:

Figs. 1 to 9 inclusive are somewhat diagrammatic vertical sectional views, showing successive steps of a method for manufacturing an article of blown glassware according to the present invention, and illustrating such parts of glass machinery adapted for use in carrying out the method as it is deemed necessary to show, in order to afford an understanding of the invention.

Figs. 10 to 16, inclusive, likewise are somewhat diagrammatic vertical sectional views, showing successive steps of another method embodying the same invention for manufacturing blown glassware and showing parts of glassworking machinery which are adapted for use in the performance of such method.

In Fig. 1, a neck mold 20 is shown in a position which may be termed "inverted" for convenience of description, the axial line of such neck mold being inclined somewhat from the vertical. This neck mold 20 preferably is of two-part construction and may be formed of any suitable material, such as metal. The axial bore of the neck mold is enlarged at 22 to provide a recess at the lower end of the neck mold when the neck mold is inverted. A combined neck forming and blowing device is associated with the neck mold and comprises a sleeve 23 which fits in the recess 22. A plunger 24 is adapted to slide in the sleeve 23 and has a reduced upper end portion 25 adapted to project into the neck mold above the sleeve 23, when the plunger is in its raised position, as shown in Fig. 1, and to cooperate with the adjacent wall of the axial cavity of the neck mold to form an annular cavity 21 for the reception of the glass which will constitute the neck finish or portion of an article of hollow glassware. The plunger 24 may have a central bore 26 adapted for connection in any suitable known manner with any convenient sources of supply of suction and pressure fluid, not shown. This central bore 26 may terminate short of the extremity of the portion 25 of the end plunger and may communicate with the neck forming cavity 21 within the neck mold through the radial passages 27 and the external groove 28 in the plunger.

An annular guide, shown rather diagrammatically at 29 in Fig. 1, is disposed at the upper end of the inverted inclined neck mold and has its axis substantially aligned with the axis of the neck mold and, therefore, inclined from the vertical. This guide 29 may be of two-part or sectional construction and may be extended at its upper end for part of its circumference, as indicated at 29a, to form a substantially semi-circular marvering support for the glass, as will hereinafter more clearly appear.

In Fig. 2, the neck mold 20, together with the associated combined neck forming and blowing device 23—24, and guide 29, have been moved as a unit by any suitable known means, none being shown, to a glass receiving position below a discharge outlet 30, in the bottom of a container 31 for molten glass. The container 31 may be a forehearth appurtenant to a glass melting furnace, not shown, and may be provided with suitable means, including the discharge regulating plunger 32 and the surrounding sleeve 33, for controlling the discharge of glass through the outlet 30 so that successive mold charge masses, such as indicated at 34 in Fig. 2, of regulably controlled and predetermined shape and weight will be formed below the outlet and may be severed from the supply of glass by the action of a pair of periodically closed shear blades 35. Preferably the container 31 will be suitably insulated and the entire glass feeding apparatus may be constructed and operated substantially in accordance with the construction and operation of the well-known Hartford-Empire Single Feeder, although other suitable known feeding apparatus may be employed.

In Fig. 2, the mold charge mass 34 of molten glass is still connected with the glass at the outlet and is in contact at its lower end with the guide 25. The shear blades 35 will then be closed to sever the mold charge glass from the supply body of glass. The neck mold, the combined blowing and neck forming device and the guide with the severed charge are moved as a unit from the glass receiving position, as to the position shown in Fig. 3. The guide 25 will serve to direct the lower end of the mold charge 34 into the upper end of the inclined neck mold so that glass will fill the cavity 21 between the neck mold and the reduced upper end portion 25 of the plunger 24, thus forming the neck finish or portion of the article of glassware that is being manufactured. The neck mold may be provided with one or more grooves 36 in the outer wall of the cavity 21 to receive glass which will form a thread or threads on the neck portion of the finished article. Suction may be employed within the cavity 21 to facilitate the entrance of the glass thereinto and to aid in holding the glass in such cavity. Thus suction may be applied through the bore 26, the passages 27 and annular groove 28 in the neck plunger. The contiguous portions of the neck mold 20 and the guide 29 are suitably formed so as to provide a substantially air tight joint therebetween at the upper end of the cavity 21.

The neck mold 20, the associated blowing and neck forming device 23—24, and the glass attached to the neck mold and partially supported by the associated guide 29, may be rotated in a clockwise direction, as shown in Fig. 4, while the guide is held stationary, so as to marver the bare glass above the neck mold. The spinning of the bare glass about the axial line of the neck mold is continued after the guide 29 has been removed, the plunger 24 is retracted in the neck mold to provide the preliminary neck aperture, and pressure fluid is admitted through the neck plunger into such preliminary neck aperture to form a bubble, as shown at 37 in Figure 5. With the construction shown, suction on the glass in the neck cavity of course will be discontinued before the blowing action commences. The neck mold, the combined blowing and neck forming device and the glass connected to and supported by the neck mold are then slowly rotated as a unit about a horizontal axis which intersects the axial line of the neck mold through the successive positions, shown in Figs. 5, 6 and 7 of the drawings, until finally the neck mold has been reverted to an upright position, as shown in Fig. 8 of the drawings. During the steps illustrated in Figs. 5, 6 and 7, the spinning of the glass in a clockwise direction about the axial line of the neck mold is continued and air pressure is applied either continuously or by discontinuous puffs to the interior of the bare glass, carried by the neck mold, to enlarge the bubble therein, as for example from the size shown at 37 in Fig. 5, through the sizes indicated at 38 in Fig. 6 and 39 in Fig. 7, respectively. When the neck mold has been reverted to upright position, as shown in Fig. 8, the spinning of the bare glass suspended therefrom may be discontinued but the puff blowing of such glass may be continued to further enlarge such glass internally, as at 40, thus forming without contact with a parison mold, a partially blown article of glassware. By suitably regulating the characteristics of the two different rotary movements of the glass carried by the neck mold and the characteristics of the blowing action on the interior of such glass during the blowing of the bare glass and giving proper consideration to the tendency of molten glass to attenuate by gravity when in suspension and also the tendency of a skin to form on glass when it is subjected to a temperature environment cooler than the glass itself, the thickness of the walls of the partially blown glassware depending from the reverted neck mold in Fig. 8 and the distribution of the glass to such walls may be controlled with substantial accuracy. Such partially blown glass may subsequently be expanded in a sectional finishing mold unit 41, as shown in Fig. 9, by fluid pressure applied through the combined blowing and neck forming device 23—24 to produce a finally blown article of glassware 42 having walls which will be substantially uniform in thickness throughout. This thickness preferably will approximate that of the neck finish or portion of the article. Since the thickness of the neck finish or portion of the article being manufactured can be accurately controlled by proper selection of cooperative neck molds and neck plungers, the articles of glassware which can be produced by my improved method will have walls sufficiently thick to satisfy service requirements but will not have excess glass in any parts of such walls. A considerable economy in the cost of manufacture of such articles thus will be effected.

After the blowing of the article to its finished form, as shown in Fig. 9 the finishing mold unit 41 will be removed to permit subsequent handling and annealing of the finished article. The neck mold and the associated combined blowing and neck forming device then may be again inverted and associated with the guide 29, as shown in Fig. 1, to initiate a new cycle of operations leading to the production of another article of glassware.

In carrying out a method embodying the same broad invention and comprising successive steps, as illustrated in Figs. 10 to 16 inclusive, the inverted neck mold 20a has an upright cupped two-part annular guide 50 associated therewith in lieu of the hereinbefore described guide 29. The neck mold 20a and the guide 50 are shown at a glass charging station in Fig. 10. A performed mold charge 51, which has been severed in suspension, is shown in Fig. 10 as falling toward the guide 50. The neck mold 20a may be identical in essential structural respects with the hereinbefore described neck mold 20 but is shown as having its axis vertical instead of being inclined from the vertical. A combined neck forming and blowing device, such as has been hereinbefore described, is associated with the neck mold 20a and the plunger thereof is shown in its raised position in Fig. 10. The neck mold 20a and the guide 50 are cooperatively formed, conveniently by having mating ribbed and grooved portions, to provide a substantially air tight joint therebetween at the upper end of the cavity 21a of the neck mold.

In Fig. 11, the mold charge 51 has fallen into the guide 50 and a portion thereof has descended into the cavity 21a, between the upper end portion 25 of the neck plunger 24 and the inner wall of the neck mold above the sleeve 23. Suction may be employed in this neck cavity to facilitate the entrance of glass thereinto to form the neck finish or portion of an article of hollow glassware. The remainder of the glass charge has flattened somewhat in the cavity of the guide 50. After the performance of the step shown in Fig. 11, the sections of the guide 50 are moved out of contact with the glass, as to the positions shown in Fig. 12, and the neck mold and the combined blowing and neck forming device are rotated about the axial line of the neck mold so as to rotate the bare glass above the neck mold to aid in controlling the shape of such glass. The neck plunger then is retracted downwardly, to provide the preliminary neck aperture, and suction having been discontinued, blowing pressure is supplied through the neck plunger into the neck aperture to form the bubble indicated at 52 in Fig. 13. During this spinning of the bare glass about the axial line of the neck mold and the blowing of the bubble in such glass, a slow reversion of the neck mold, the combined blowing and neck forming device and the bare glass as a unit is occurring as indicated in Fig. 13. At the time of the performance of the step illustrated in Fig. 14, the neck mold has been reverted nearly to upright vertical position, the spinning of the glass carried by the neck mold and the blowing of such glass either by a series of puffs of regulable intensity or by continuous application of regulably controlled pressure still continues so that the bare glass carried by the neck mold will have a controlled shape which may be somewhat as indicated at 53 in Fig. 14. In Fig. 15, the neck mold 20a is shown in its reverted upright or vertical position and a sectional finishing mold unit 54, including a bottom plate 55, has been closed about the partially blown glass 56 which depends from the neck mold. The glass 56 is expanded in the finishing mold by pressure fluid applied through the combined neck forming and blowing device 23—24 to provide the body of the completely blown article 57, as shown in the finishing mold in Fig. 16.

It is to be understood that the structures herein shown and the method steps herein described may be variously modified and combined without departing from the spirit and scope of my invention, which is not to be limited except by a fair interpretation of the appended claims.

I claim as my invention:

1. The method of making blown glassware which comprises delivering a glass charge downwardly into an open ended inclined marvering guide at the upper end of a generally inverted but inclined neck mold having a raised neck plunger therein, applying suction through the neck mold to draw glass downwardly from the guide into the cavity about the upper portion of the neck plunger in the neck mold, rotating the neck mold and the glass about the longitudinal axis of the neck mold while maintaining the guide stationary to marver the glass in the guide, removing the guide, withdrawing the neck plunger downwardly to provide an initial neck aperture in the glass in the neck mold, reverting the neck mold and the glass and continuing the rotation of the neck mold and the glass about the longitudinal axis of the neck mold during part of said reverting movement, blowing the glass by pressure fluid applied through the initial neck aperture during part of said reverting movement, and blowing the glass below the reverted neck mold to final form in a blow mold.

2. The method of making blown glassware without the use of a parison mold which comprises depositing a charge of molten glass in an open ended annular guide at the upper end of an inverted neck mold, receiving a portion of the glass in the neck mold, controlling the extent of chilling of the glass in contact with said guide with respect to the chilling of the remaining glass to prevent any abrupt gradations in skin thickness on the glass charge, forming the glass in the neck mold into the neck finish of the article being made, removing the guide, partially expanding the glass by introducing pressure fluid thereinto while said glass is supported only by the neck mold, closing a blow mold about the partially expanded glass, and finish blowing such glass in the blow mold.

3. In a glass working apparatus, a neck mold adapted to be rotated about its longitudinal axis, an open ended annular guide at one end of said neck mold and in axial alignment therewith, said guide being adapted to receive a charge of molten glass and to direct part of such glass into the neck mold, said guide being extended longitudinally for part of its circumference at the end thereof remote from said neck mold.

Signed at Hartford, Conn., this 2nd day of January 1929.

GEORGE E. ROWE.